(No Model.)

H. H. WEBB.
DAMPER FOR STOVES OR FURNACES.

No. 540,806. Patented June 11, 1895.

WITNESSES
J. W. Dolan.
E. L. Sherman.

INVENTOR
Harry H. Webb
by his attys
Clarke & Raymond

United States Patent Office.

HENRY H. WEBB, OF BOSTON, MASSACHUSETTS.

DAMPER FOR STOVES OR FURNACES.

SPECIFICATION forming part of Letters Patent No. 540,806, dated June 11, 1895.

Application filed March 31, 1894. Serial No. 505,824. (No model.)

*To all whom it may concern:*

Be it known that I, HENRY H. WEBB, a citizen of the United States, and a resident of Boston, in the county of Suffolk and State of Massachusetts, have invented a new and useful Improvement in Dampers for Stoves and Furnaces, of which the following is a full, clear, and exact description, reference being had to the accompanying drawings, forming a part of this specification, in explaining its nature.

The invention relates to what may be called a pipe damper, in that its casing is of the size of the flue pipe and in that it is made of sheet metal, of which such pipe is ordinarily constructed. It embodies two features—namely, the damper proper which acts to close or partially close the passage in the pipe, and also openings or holes in the pipe so placed that they co-act with the damper sections which are of peculiar shape to form cold air inlets when the damper sections are closed or partly closed.

Figure 2:
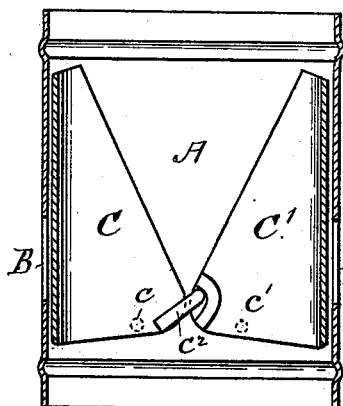
Figure 1:
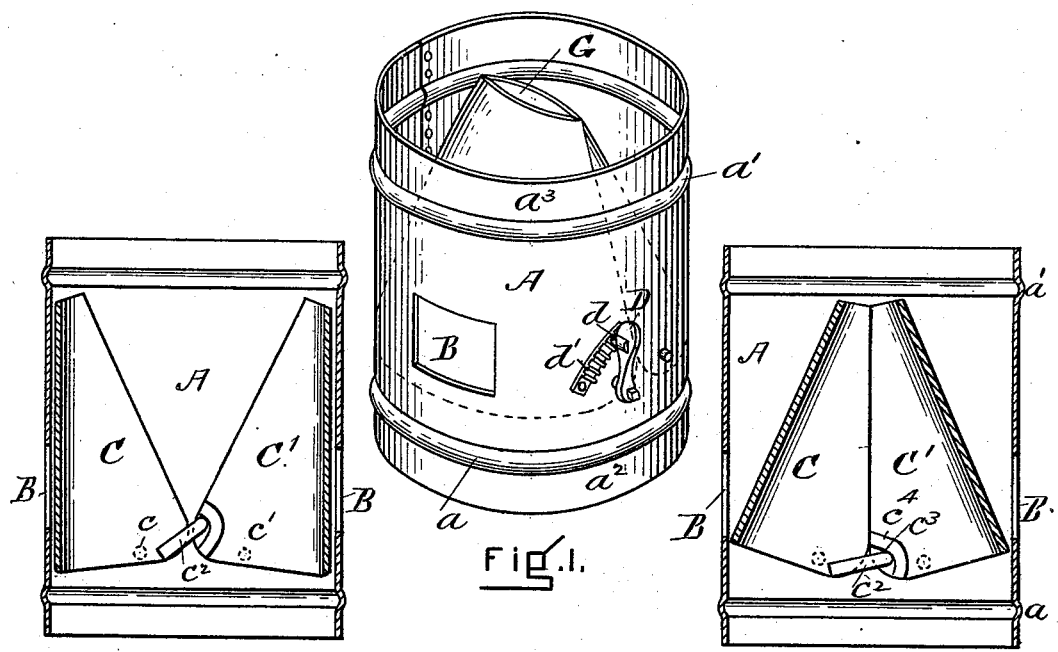
Figure 3:
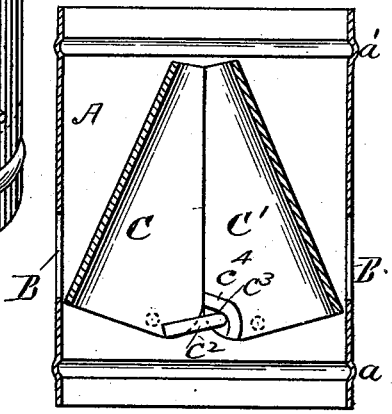
Figure 4:
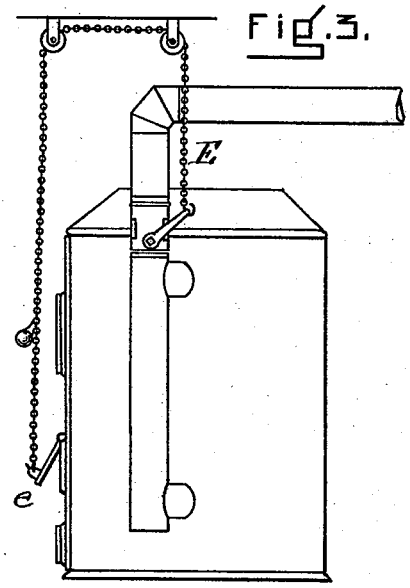

In the drawings, Figure 1 is a view in perspective of my improved damper, showing the sections as closed. Fig. 2 is a vertical section representing the damper as wide open and the cold-air inlets as closed. Fig. 3 is a view in vertical section of the damper with the parts in the position represented in Fig. 1. Fig. 4 shows a method of operating the damper from the front of the furnace, to which reference is hereinafter made.

In the drawings, A represents the pipe section which forms the casing for the damper. It preferably has the beads $a\ a'$ near each end to act as shoulders for the reception of the pipe sections with which it may be used, and the parts $a^2\ a^3$ without said beads may be slightly reduced in size to receive pipe ends and act as collars.

The pipe is made preferably of sheet iron and it has the openings or inlets B formed by removed sections of it, and these openings are arranged in relation to the damper as is hereinafter specified.

The damper is made in two parts, namely, the sections C and C', and each section is in the shape of a hollow, flattened half of a cone. This shape is necessary, in order that each section may close the opening in the casing or shell when it is wide open by shutting against the inner surface of the casing about said hole. In other words, when wide open the curved section of each damper part must be concentric with the inner curve of the casing, and each damper section must be pivoted to the casing, so that, when wide open, each section shall have its curved back in contact with the inner surface of the casing from top to bottom. See Fig. 2.

In Fig. 2 the damper sections C C' are represented as pivoted at $c\ c'$ respectively to the outer case or shell. I prefer that the damper sections be connected with each other so that the movement of one shall cause the movement of the other, but in the opposite direction, and I have represented one way of making this connection in Figs. 2 and 3, where the section C has the finger or projection $c^2$ from one or both of its lower inner corners, which extends into the curved recess $c^3$ formed by a rib $c^4$ upon the opposing corner or corners of the other section, the inner edge of the rib being so shaped that upon contact of the end of the finger therewith and movement of the finger thereon, the damper section upon which it is caused to be moved in one direction or the other. See Figs. 2 and 3. I do not confine myself to this especial means for connecting the two damper sections, however. In Fig. 1, one of the pivots of one of the damper sections is extended through the case and receives the end of an operating handle D and the handle has a tooth $d$ which engages with the notches of the rack $d'$ fastened upon the outer side of the case or pipe. In Fig. 4, instead of a handle a lever is represented as attached to said pin and is connected by a chain E with the door $e$ to the ash pit and in such manner that upon the opening of the ash pit door to establish a draft, the damper is opened, and upon the closing of the door, the damper is closed and the cold air inlets opened. In use, the damper sections wide open close the cold air inlets B and when partially or wholly closed, they open them. See Fig. 1. The apexes or upper ends of the damper sections are cut off to form a gas escape G.

The advantages of the invention arise from the cheapness of the construction and from the fact that the damper sections serve in two capacities—namely, to close the draft or to close the cold air inlets.

Another advantage arises from the fact that it is not necessary to enlarge the flue to obtain substantially its full capacity, as the damper sections when wide open lie against the inner surface of the pipe and do not materially decrease the size of the flue, the amount of the decrease being limited to the thickness of the damper sections which is not enough to affect the draft.

I would say that the invention may be applied directly to a pipe of long length instead of to an intermediate or short section.

While I have mentioned the damper case or shell as made of sheet metal, I would say that it can also be made of cast metal.

Having thus fully described my invention, I claim and desire to secure by Letters Patent of the United States—

1. In a damper for stoves and furnaces, the casing A having openings B, and the damper sections C C' shaped to fit the interior of the casing when wide open and supported in the casing by separate pivots the lines of the axes of which extend across the casing near its center, and means for simultaneously oscillating the two sections on their pivots, substantially as set forth.

2. In a damper for stoves and furnaces, the casing A having openings B, and the damper sections C C' shaped to fit the interior of the casing when wide open and supported in the casing by separate pivots the lines of the axes of which extend across the casing near its center, one of said sections having a recess $c^3$ and the other having a projection $c^2$ entering said recess, and a handle or lever outside the casing and connected with one of said sections substantially as and for the purpose set forth.

HENRY H. WEBB.

Witnesses:
F. F. RAYMOND, 2d,
J. M. DOLAN.